Patented Jan. 26, 1932

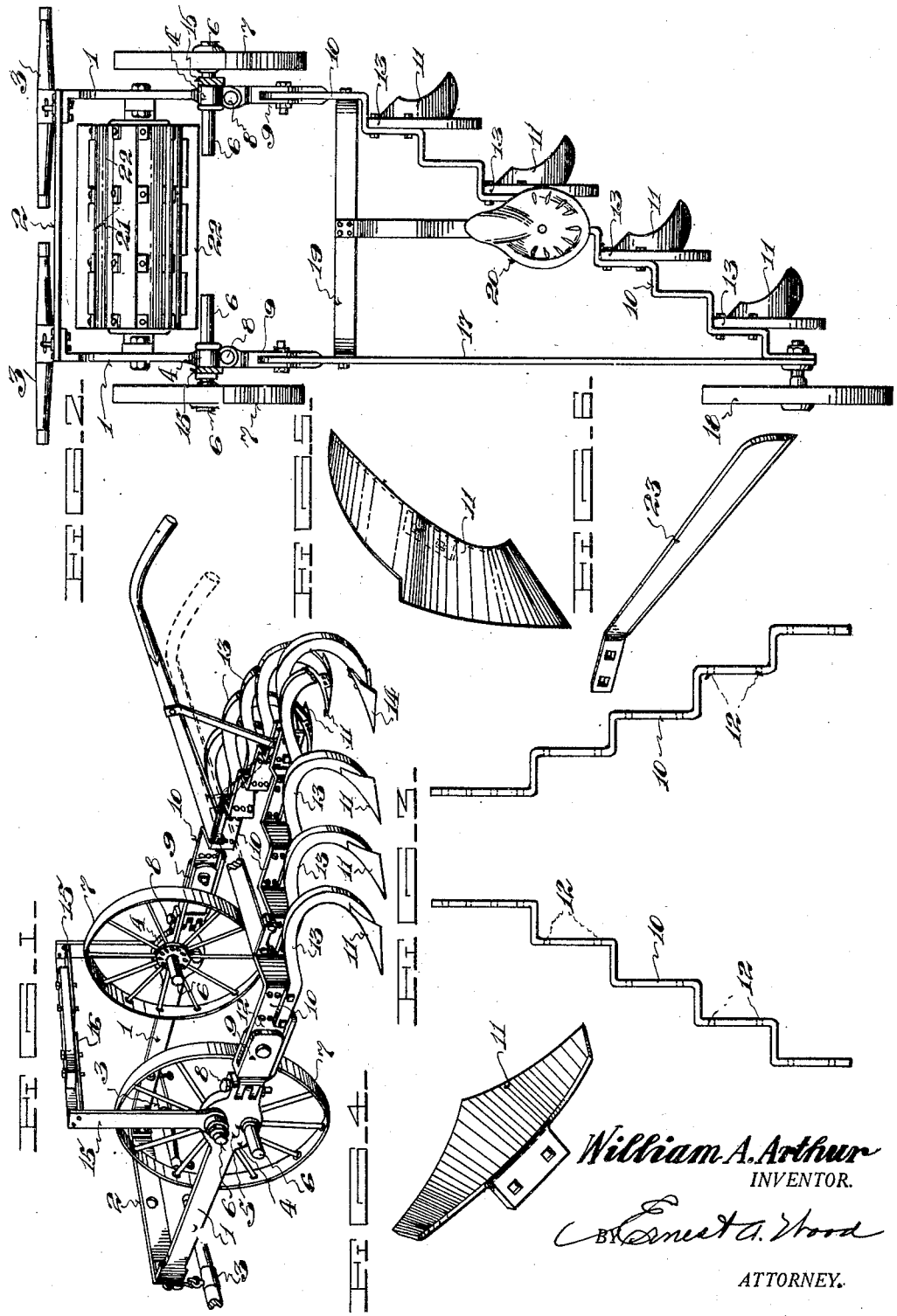

1,842,892

UNITED STATES PATENT OFFICE

WILLIAM A. ARTHUR, OF TEXARKANA, TEXAS

COMBINATION PLOW

Application filed January 9, 1930. Serial No. 419,530.

This invention relates to agricultural implements and it has particular reference to an all purpose plow, the principal object of the invention being to provide an implement of such design and construction as to replace several individual types of farming implements by certain simple adjustments, and through the medium of which the farmer with small acreage in cultivation is enabled to take care of his crops without being put to the usual expense of an implement for each operation in bringing the crop to maturity.

Another object of the invention resides in the provision of an improved plow of obviously simple and practical design wherein the plow supporting elements are interchangeable and reversible and capable of accommodating plows and shovels of different types, whereby a change from one type of implement to another may be made in a minimum of time and in the field if found to be necessary.

Still another object of the invention resides in the provision of a frame structure so constructed that the wheels may be mounted to straddle the rows of vegetation or move therebetween, that is to say, the implement embodying the invention may be quickly converted from a one row to a two row machine by simply changing the wheels from the outside to the inside of the frame.

The invention further comprehends among its provisions an all purpose plow for tilling the soil and having the added facilities for serving as a planter by certain provisions in the frame to accommodate a seed hopper and dropper, also the same provisions may be as effectively employed to receive a stalk cutter, when such is required, to precede a gang of moldboard bottoms affixed in successive stopped relationship behind the frame for turning under the stalks as they are cut.

With the foregoing objects as paramount, the invention has particular reference to its salient features of construction, arrangement and novel method of assembling the various parts of the machine, to become manifest as the description proceeds, taken in connection with the accompanying drawings wherein:—

Figure 1 is a perspective view of an implement constructed according to present invention.

Figure 2 is a plan view of a modified form, showing the machine converted into a different type of implement for turning soil.

Figure 3 is a detail view, showing the stepped plow beams in a position for plowing two rows.

Figure 4 is a perspective view of the preferred type of plow shovel for use in cultivating.

Figure 5 is a detail view of a moldboard share employed for turning soil, and

Figure 6 is a view illustrating the stepped plow beams reversed for straddling a row of vegetation.

In the advent of motorized farming implements, the needs for the small farmer and planter have been greatly neglected, and since their means is limited, these farmers are constrained to make use of less modern equipment with which to till their soil, plant and reap their harvest. The present invention aims to provide an implement for universal use on a farm, whether it be small or a large plantation, from the first opening of the soil to the final turning under or raking of the stalks in the field. In making these provisions in a single machine, farmers of the kind above referred to are enabled to make certain changes in their farming requirements, such for example as changing from a turning plow to a cultivator or the like, without requiring an additional implement for the specific purpose.

Accordingly, the invention is comprised of a simple frame structure in the form of a pair of beams 1, with a cross bar 2 at one end securing the beams and to which is attached single trees 3 or a double tree, if found to be necessary or desirable.

These beams 1, as apparent especially in Figure 1, have enlargements 4 in which three or more apertures 5 for the reception of stub axles 6 are provided and arranged in vertical alinement. In so arranging the apertures, the wheels 7 may be mounted on the axles therein to raise or lower the frame 1 as the plants attain maturity, that is to say, adjustment as to height may be made in the machine. Moreover, it is apparent that the wheels 7 may be mounted either inside or outside of the frame. This feature enables the wheels to be disposed between two rows of vegetation or straddle one row.

An adjustable fulcrum 8 is provided in the frame rearwardly of the wheels and through the pivotal connection between the joint 9 and plow beams 10, yieldability both vertically and laterally of the plow beams 10 is obtained, in the event an obstruction is encountered by the plows in the soil. This yieldability renders the load less strenuous and causes the plows 11 to follow in a straighter course behind the frame.

The plow beams 10, as apparent in the drawings, are stepped or offset, and in each offset there is provided a series of apertures 12 in vertically alined relationship to receive bolts by which the shanks 13 are affixed, which latter, in turn, carry the shovels 11. These shovels are applied to the shanks 13 in the case of the cultivator, is shown in Figure 1, so that the machine may be moved between the rows, throwing the soil from the middle furrow outward onto adjacent rows. Particular notice will be taken of the type of plow shovel employed, it being of a substantially triangular shape as apparent in Figure 4, and reversible on the shank. This feature allows the soil to be turned in one direction by the center shovel 14 and successively engaged and turned by each succeeding shovel, which obviously moves the soil toward the vegetation in a smooth, even hill without disturbing the plants nor creating furrows to carry water away from the plants.

In setting the shanks 13 on the beams 10 to obtain proper penetrating depth of the plows 11 and that they may conform with the furrow between the rows, various ones of the sets of apertures 12 are used, that is to say, the center plow 14 is usually set lower than the next preceding plow, and throws the soil outward in both directions to be successively engaged and displaced by each succeeding plow until the top of the row is reached by the last or highest plow. The plow shown in Figure 1 shows all of the shanks set on one plane, but it is obvious that by minor adjustments requiring only a minimum of time, any position of the plows may be obtained which may be desirable to meet various plowing conditions.

The transposed position of the beams 10, shown in Figure 3 illustrates the adjustment whereby it is rendered possible to plow opposite sides of a row of vegetation, but in this case, it is usually practicable to mount the wheels 7 on the stub axle 6 outside of the frame 1 to straddle the row of plants. Also, the plows 11, instead of being disposed on the shanks 13 to throw the soil outward, are reversed to turn the soil inward and upward toward the plants on either side thereof. Other adjustments, such as frame height, and relative positions of the shanks 13 on the beams may be made as in the case of the type of implement shown in Figure 1.

Another important feature of the present invention resides in the extensibility in the width of the frame, by the provision of uprights 15, having a cross member 16 capable of extension, in the manner illustrated, or by means of some mechanical equivalent. This feature enables the frame to be extended over two or more rows of vegetation, and by the simple provision of a cross member to support additional plow beams, cultivation of two or more rows of vegetation may be accomplished with as much efficiency as one row. The type of plow shown in Figure 1 is of the walking type, but there is nothing to prevent the attachment of a seat in event one is desired, as in the case of the turning plow shown in Figure 2.

The turning plow requires the additional elements of a draft brace 17 affixed at one end of the frame 1, opposing securing point of the plow beam 10 thereto, and at its other end to the free end of the plow beam. The single plow beam used in this type of plow is thus secured in a diagonal plane with respect to the rows of vegetation, the breaking plows affixed thereto being arranged, one behind the other in successive inset order to receive the throw of the adjacent plow.

The beam 10, in the case of the turning plow is of greater length than those of the other types of implements described, into which the invention may be converted, and accordingly, it has been found practicable to support the free end by an auxiliary wheel 18, to the axle of which the brace 17 is secured. Also, a lateral brace 19 is provided, which extends across the frame and to which the seat 20 is affixed.

The foregoing description deals with certain common types of soil working implements, but the invention is obviously not restricted to these specific types, since it is apparent that the beams 10 may be multiplied and arranged to increase the amount of soil turned. An example of such added conveniences is shown in Figure 2, in which a stalk cutter is illustrated comprised of a drum 21, mounted on a shaft extending across the frame, and having thereon the conventional cutting knives 22. In preparing the soil for a new crop, the plow illustrated in Figure 2 may be put to good use in first cutting the stalks and turning them under by the plows following.

It is obviously possible, and practicable, to install a suitable planter attachment in the frame 1 in advance of the wheels and setting the plows accordingly. This attachment is not herein shown since it does not constitute a part of the present invention.

Another important feature of the present invention, increasing its effectiveness for farm use resides in its ability to function as a harrow by affixing a series of teeth 23, such as shown in Figure 6 to the beams 10 in place of the plows. The harrow teeth are so shaped as to cut into hardened soil and reduce the clods to a suitable uniformity for planting. The invention may likewise serve as a hay rake by substituting suitable spring forks for the plows or teeth mentioned in the foregoing.

Manifestly, the construction shown is capable of considerable modification and such modification as is considered within the scope and meaning of the appended claims is also considered within the spirit and intent of the invention.

What is claimed is:

1. An agricultural implement including a wheeled frame capable of width and height adjustment and interchangeable plow supporting beams securable to said frame for limited vertical and lateral displacement, said beams being constructed with a series of right angular recessions to receive plow shanks of equal length in successive order.

2. An agricultural implement including a wheeled frame capable of width and height adjustment and plow beams constructed with a series of recessions, each having vertically alined apertures to effect the securement of plow shanks at said recessions.

3. An agricultural implement including a frame comprised of two sections having extensible connecting members and supported upon wheels, the axes of which are adjustable relative to said frame, and plow beams having a series of right angular recessions to receive plow shanks of equal length and capable of being reversibly secured relative one to the other and to said frame.

4. An agricultural implement including a wheeled frame and plow beams securable thereto for limited vertical and lateral movement and having right angular offsets to operatively receive plow carrying shanks of equal length whereby said shanks will be disposed successively in a diagonal plane relative to the normal direction of travel of said implement.

5. An agricultural implement including a wheeled frame having displaceable axles to effect the height of said frame and plow beams securable to said frame for limited vertical and lateral movement, said beams having a multiplicity of right angular offsets for the reception of plow carrying shanks, whereby said plows will be disposed on an angular plane relative to the normal direction of travel of said implement.

In testimony whereof I affix my signature.

WILLIAM A. ARTHUR.